4 Sheets.

Shc

[71.]

EDWARD H. STEARNS.

Improvement in Head Blocks for Saw Mills.

No. 4,551.

Reissued Sep. 12, 1871.

Witnesses.

H. F. Howard

A. M. Gent Jr.

Inventor.

E. H. Stearns by

Munson his atty

A.M. PHOTO-LITHOGRAPHIC CO. N.Y. (OSBORNE'S PROCESS.)

[71.]
EDWARD H. STEARNS.
Improvement in Head Blocks for Saw Mills.
No. 4,551. Reissued Sep. 12, 1871.
Fig. 3.
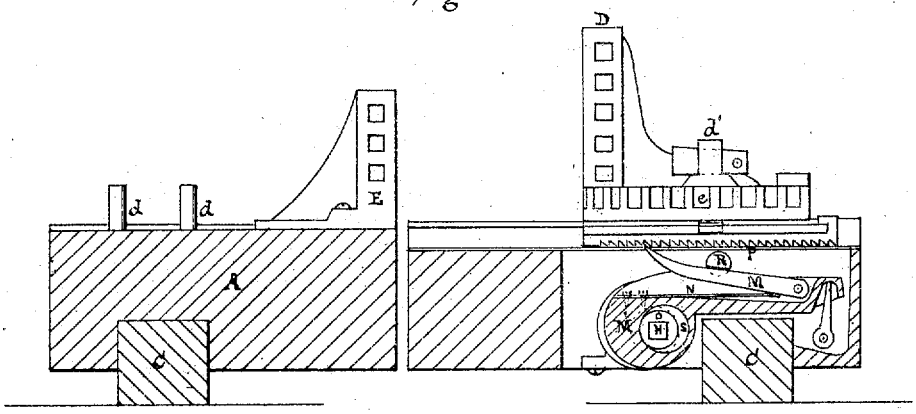
Fig. 4.
Fig. 5.
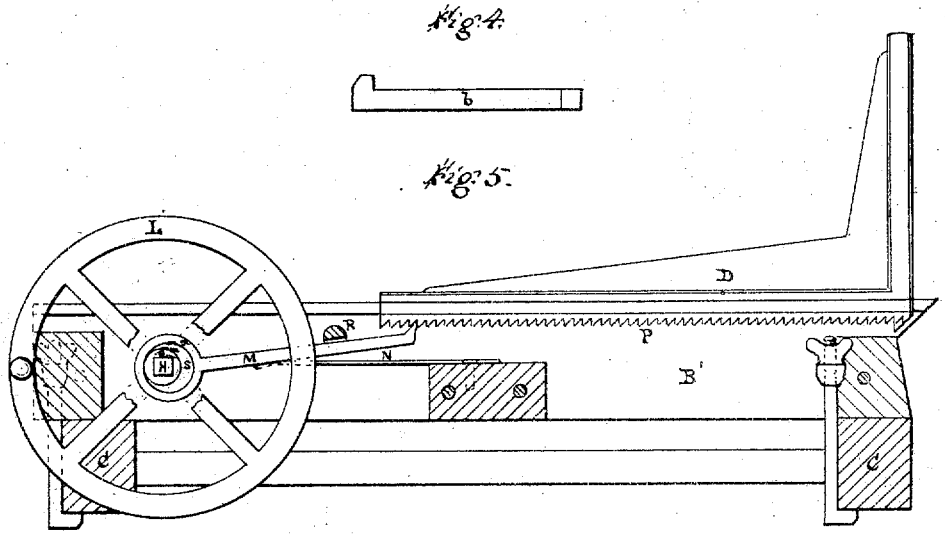
Fig. 6.
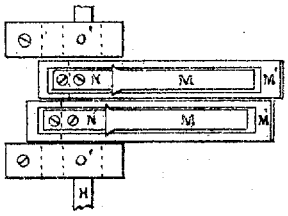
Witnesses.
H. W. Howard
A. M. Stout Jr.
Inventor.
E. H. Stearns by
A. M. Stout his atty
AM. PHOTO-LITHOGRAPHIC CO. N.Y. (OSBORNE'S PROCESS.)

EDWARD H. STEARNS.

Improvement in Head Blocks for Saw Mills.

No. 4,551. Reissued Sep. 12, 1871.

Witnesses.
W. H. Howard
A. M. Gent

Inventor.
E. H. Stearns by
A. M. Gent his atty

AM. PHOTO-LITHOGRAPHIC CO. N.Y. (OSBORNE'S PROCESS.)

[71.]

EDWARD H. STEARNS.

Improvement in Head Blocks for Saw Mills.

No. 4,551. Reissued Sep. 12, 1871.

Witnesses.

H. W. Howard

A M Gunt Jr

Inventor.

E H Stearns by

A W Stout his atty

AM. PHOTO-LITHOGRAPHIC CO. N.Y. (OSBORNE'S PROCESS.)

UNITED STATES PATENT OFFICE.

EDWARD H. STEARNS, OF ERIE, PENNSYLNANIA.

IMPROVEMENT IN HEAD-BLOCKS FOR SAW-MILLS.

Specification forming part of Letters Patent No. 14,700, dated April 15, 1856; extended seven years; reissue No. 4,551, dated September 12, 1871.

*To all whom it may concern:*

Be it known that I, EDWARD H. STEARNS, of Erie, in the county of Erie and State of Pennsylvania, have made a new and useful invention in Head-Blocks for Saw-Mills, of which the following is a specification:

The object of this invention is to improve the construction and arrangement of the operating devices in head-blocks for saw-mills, whereby the logs are moved laterally toward the saw any desired distance with certainty, accuracy, dispatch, and ease, and when the sliding standard or knee of head-block with the log has been moved the distance desired the devices that caused their movement may be taken out of such contact and the knee or standard can be reciprocated back to its original position and receive another log to be again moved to the saw in like manner; and it consists in the construction and arrangement of the devices that form the means for so moving the log, and their relation in a head-block or any number of head-blocks on the same carriage; also, in the means used by which the devices that move the log laterally to the saw are forced out of gear or contact with the sliding standard of a head-block, so that it can be returned to its original position; and, also, in the device for holding the log upon or in contact with the sliding standard or knee of a head-block, as is more fully hereinafter described.

Figure 1:
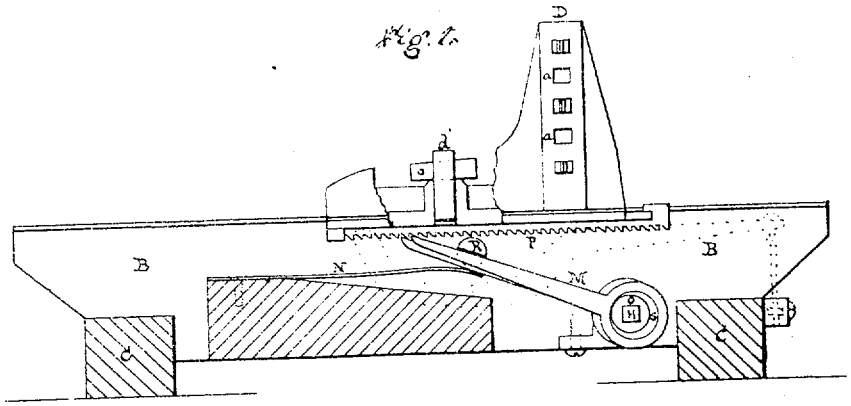
Figure 2:
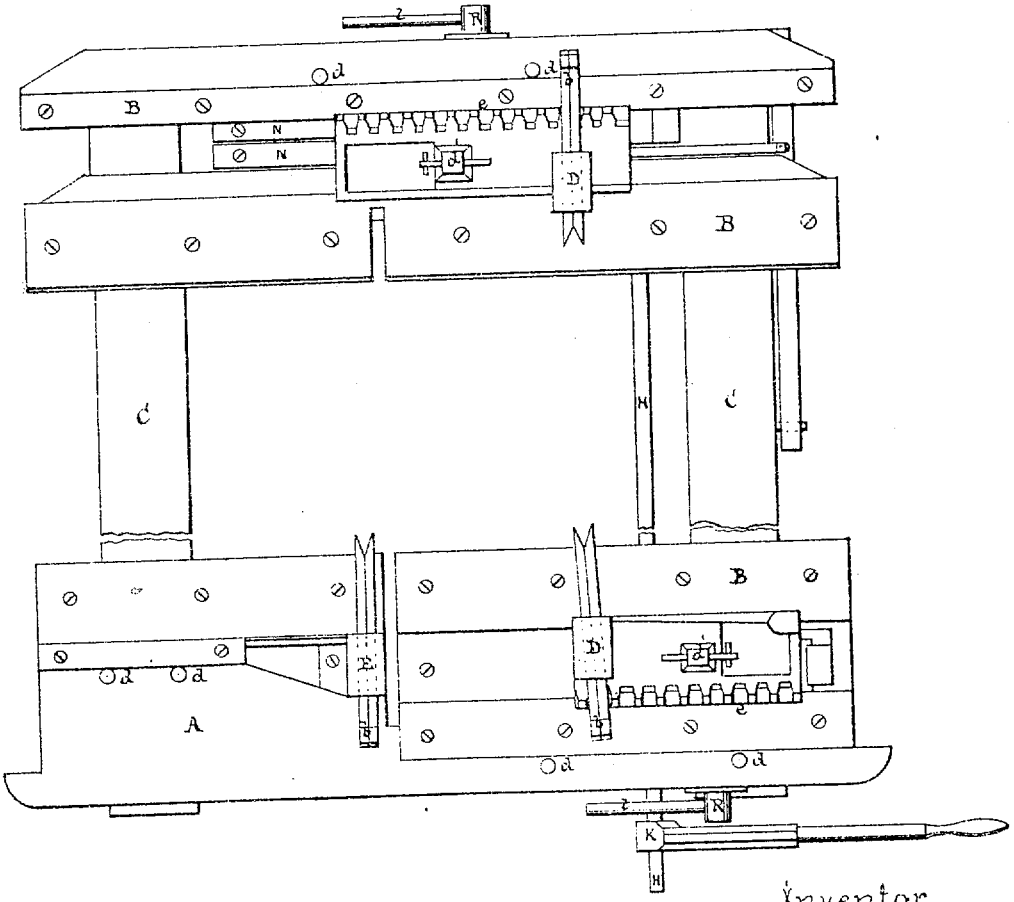
Figures 7, 8:
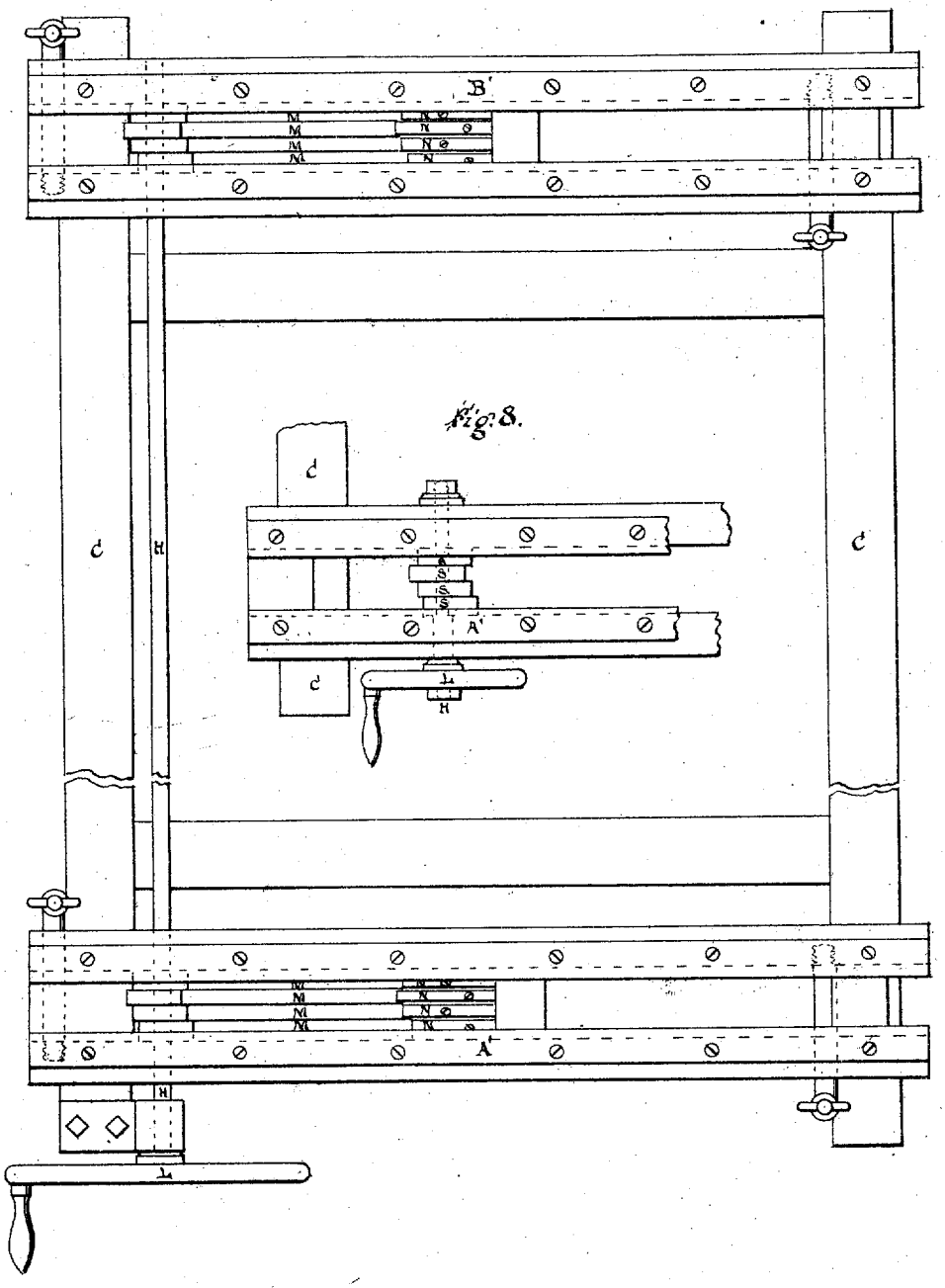
Figure 9:
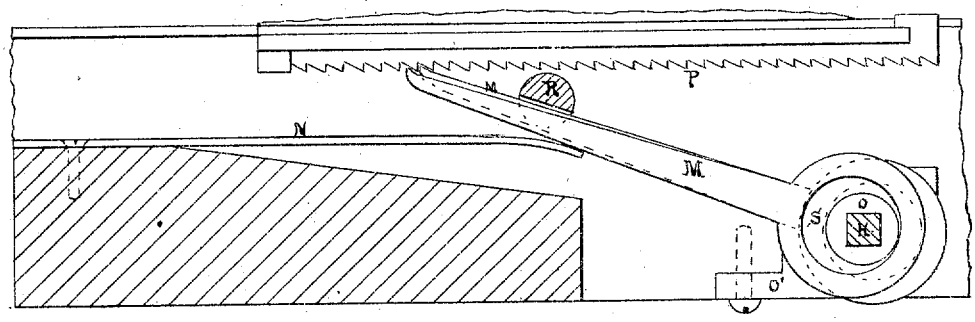
Figure 10:
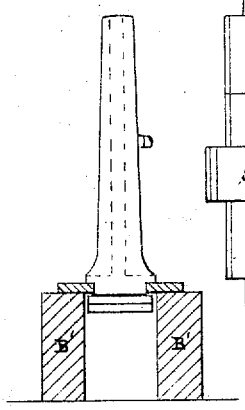
Figure 11:
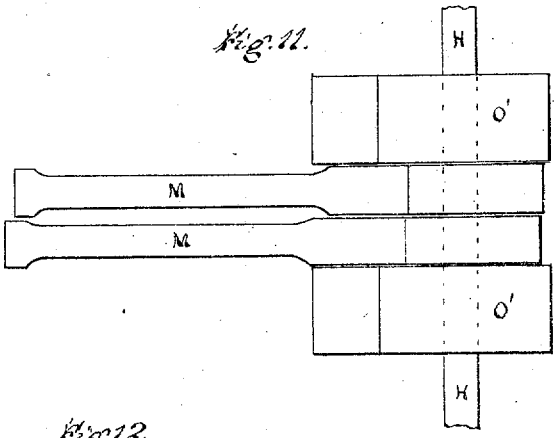
Figure 12:
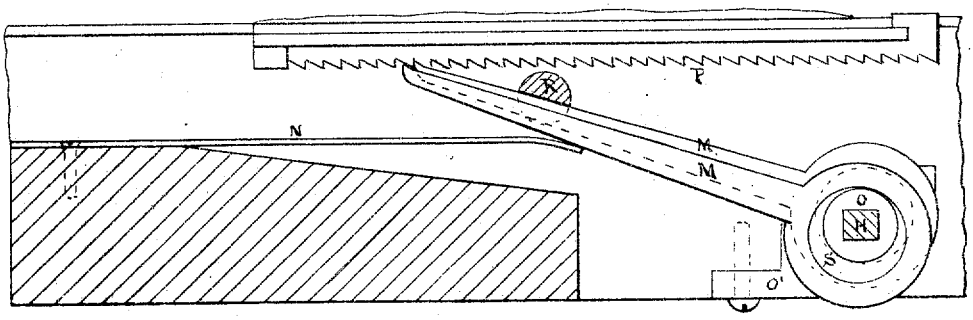

In the drawing, Figure 1 represents a longitudinal vertical sectional view; Fig. 2, a plan view, as applied to sash or muley-saws; Fig. 3, a longitudinal vertical section of same, showing a jointed pawl, used where there is lack of space and where straight pawls cannot be used. Fig. 4 is a side view of a self-tightening dog. Fig. 5 is a vertical longitudinal sectional view, as used with circular saws, with eccentrics, pawls, springs, and cam-shaft, operated by crank-wheel. Fig. 6 is a plan view of jointed pawls on their eccentrics and shaft. Fig. 7 is a plan view of Fig. 5 in cross-section, as connected by the shaft with another head or foot-block. Fig. 8 is a plan view of the eccentrics, shaft, and attachments. Fig. 9 is a longitudinal sectional view of a head-block with parts broken away to show an enlarged view of the two eccentrics upon their journals as arranged upon their shafts, and having two pawls upon the eccentrics with their points in contact with the rack on the under side of a sliding standard or knee. Fig. 10 shows a front view of one of the sliding standards and end view of the block. Fig. 11 is a detached view of a pair of pawls on their eccentrics, their bearings, and shaft. Fig. 12 shows the difference in position of the eccentrics, as seen in Fig. 9; and Fig. 13 is a plan view of two eccentrics, showing their relative eccentric positions with each other as arranged on one shaft.

A, B, and B′, are the supporting parts of the head-blocks, as used in their different positions. C C are the longitudinal sides of the carriage; D, the sliding standard or knee. E is an upright, used on head-blocks with sash or muley-saws, for containing a holding-dog. *d d* are vertical pins for a fulcrum to move the sliding standard laterally by inserting a bar or lever in notches *e* of the standard and bearing against said pin *d*. H is a horizontal shaft passing transversely through each head-block and journaled therein to freely revolve or vibrate, and may extend through and be connected with the head-block at the tail of the carriage, or with any number of head-blocks on the same carriage. K is a lever, so attached to shaft H that it may vibrate said shaft; or a crank-wheel, L, may be used where the shaft is to be revolved. M M are pawls, made of metal and having an eye or yoke with a round opening therein—a projecting arm with a point at its extreme end to engage with notches on a reciprocating rack. S S are eccentrics, turned on their faces to a perfect circle, but have a hole through each to admit the shaft to pass through them. This hole is not in their centers, but is eccentric to the center of its axis of motion, which can be to any desired extent, and can slide upon the shaft H, as circumstances may dictate. Outside of these wheels or eccentrics are their journals O.

Figure 13:
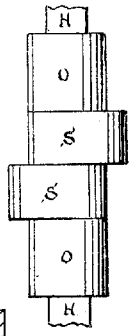

In theory, each eccentric S is simply a wheel placed eccentrically on shaft H; but, in practice, it is made by turning them, all that work the same rack, in one piece of metal, including their journals O O, which not only connects them solidly in one piece, making them durable, but also serves as a sleeve on shaft H, which passes through it, as shown in Fig. 13. The peripheries of the eccentrics may be made broad to increase their wearing-surfaces, thereby increasing their durability.

The journals O O outside of the eccentrics rest upon bearings in the sides of the blocks, and sustain the shaft H and the wear consequent upon the vibration or revolution of the shaft and the devices it sustains and operates. Upon these eccentrics S S are placed the pawls M, the eyes in the yokes fitting around and upon the peripheries of the said eccentrics; and as the shaft with the eccentrics vibrates in either direction one of the pawls will be forced forward, and if in gear with a notch on a rack, the rack, and that to which it is attached, will be forced forward to the extent of the throw of the eccentric that operates that pawl; and where two eccentrics operate two pawls in the same rack the movement will be intermitting; but both pawls act to force the rack forward alternately, the last pawl taking hold of a notch in the rack and forcing the rack forward and out of the reach of the first, and at the same time the first pawl is receding in its movement by the reverse action of the eccentric, consequently moving the rack forward at each vibration of the shaft, whether the vibration is in one direction or the other. P is a metal ratchet-rack, and is firmly attached to the under side of the sliding standard or knee D, and is furnished with a series of notches in which the pawls M fit and take a firm hold of when the shaft H is oscillated or revolved, and is wide enough to receive side by side one, two, or more pawls, which work in the notches.

In Fig. 9 the pawls M are upon the eccentric and in gear with the notches on rack P. The near one of the two eccentrics is in position forward at the dead-point or center of motion, while the other is in or nearly in the opposite position. In Fig. 12 both eccentrics are in an intermediate position, each equally distant from the dead-point or point of no forward movement of the extreme end of the pawls.

Any quick or violent movement given to the eccentrics will not throw the rack beyond the stopping point, because the movement is gradually diminishing until it ceases at the dead-point, and consequently there will be no momentum to carry the sliding standard and log too far or beyond the stopping point, as there is no inertia of motion to overcome; and a further advantage in this construction is, the purchase of the shaft upon the pawl increases as the motion given to the rack decreases, so that when the point of the pawl reaches the dead-point there can be no torsion of the shaft, as the constantly-decreasing movement of the rack allows the shaft to recover its normal condition before the dead-point is reached by the pawls; hence perfect uniformity as to the distance one or any number of sliding standards or knees of head-blocks operated by the same shaft will be had, and where accuracy is indispensable this mode of setting the log to the saw is complete.

Where two pawls are used, that working below the dead-point should be a half notch shorter or longer than the other, as shown in Fig. 11, in order to divide the notches, so that there may be a dead-point stopping place at every half notch as well as at every whole one on the rack. The length of the notches on the rack may vary so as best to accommodate the various thicknesses of lumber to be sawed, having regard always to the thickness of different saws and the kerf they cut. The throw of the eccentrics can be constructed in such manner as to actuate the pawls to move the rack a quarter of an inch at each vibration of the shaft, or any other distance over or under that given. The degrees of their distance apart in the circle may be varied so as to give the best and most convenient sweep to the setting-lever.

N N are springs that are firmly secured at one end to the head-block, while the other bears against the pawls to hold them in contact with the notches of the rack P, and there are as many springs as there are pawls in each head-block.

The application of this principle of setting a log laterally to a saw by means of an eccentric on a vibrating or revolving shaft, actuating a pawl or any number of pawls to move a rack and thereby the log, is believed to be new and never before attempted. This construction will accommodate the moving of the head-blocks to suit the different lengths of logs, or to any number of head-blocks that may be necessary to have on the same carriage. By this construction of devices no retrograde movement of the log can occur, because as one or more pawls are advancing one or more will be receding; consequently one or more pawls will be in action while the others are receding preparatory to again coming into action on the rack, and any retrograde movement of the log or rack prevented.

R is a cam-shaft, journaled transversely, and in each side of the head-block, so as to be easily rotated on such journals. It is made flat in its central portion of length on one side by removing one-half or nearly one-half of the metal of the shaft, and so placed in the blocks as that the flat side shall be next the pawls when the pawls are acting upon the rack; but by revolving the shaft to bring the round or cam side of it to bear upon a pawl or any number of them, they will be forced out of contact with the notches of rack P, and allow the rack and the sliding standard or knee to be freely moved back clear of the pawls. This shaft R is operated by a hand-lever, *l*, and, by vibrating the lever in either direction, will force the pawls out of gear with the notches of the rack P. *b b* are dogs for holding the log in place on the head-blocks by driving them into the ends of the log through holes in the standards D and E on head-blocks for sash or muley-saws, and are constructed to be self-tightening, and can be made to expand at their points, and are constructed in the following manner: The end that is toward the sawyer has a gib-head; the body is as wide again as it is thick, and the end that is to be driven into the log is made sharp by beveling it to an edge, principally from one side. Two of these dogs are put together, and when so put together form a square of equal dimensions on each of its four sides, and will just slide easily through any of the mortises *a* in the sliding standard or knee into the end of a log. They can be put through the mortise so as to have the edges horizontal or perpendicular, as circumstances may dictate; but the beveled sides are placed together, and as they are driven into the end of the log the inclination of the beveled sides forces the two apart at their edges, and clamps them tight in the standard or knee.

Having thus described my invention, what I claim, and desire to secure by Letters Patent, is—

1. The eccentrics S S, when placed upon the oscillating shaft H, and operating the pawls of a head-block, substantially as described.

2. The combination of the eccentrics S S, and journals *o o* with the shaft H, constructed to operate in the manner and for the purpose substantially as described.

3. The wheel L and shaft H, in combination with one, two, or more eccentrics, S, substantially in the manner and for the purposes shown and described.

4. The combination of two or more eccentrics' S, on oscillating shaft H with two or more pawls' M, springs N, and rack P on the under side of the sliding standard or knee, giving a forward movement to the rack, whether the shaft is oscillated forward or backward, substantially as shown and described.

5. The cam-shaft R, for throwing the pawls M out of contact with the notches in rack P, constructed to operate substantially as described.

6. The double dog *b*, in combination with the mortise *a* of standards D and E, constructed to operate as described.

E. H. STEARNS.

Witnesses:
EDM. F. BROWN,
ALEX. M. STOUT, Jr.

(71.)